United States Patent [19]
Daimon et al.

[11] Patent Number: 5,304,446
[45] Date of Patent: Apr. 19, 1994

[54] HYDROXYINDIUM PHTHALOCYANINE CRYSTALS AND ELECTROPHOTOGRAPHIC PHOTORECEPTOR

[75] Inventors: Katsumi Daimon; Katsumi Nukada; Akira Imai; Masakazu Iijima; Toru Ishii, all of Minami-ashigara, Japan

[73] Assignee: Fuji Xerox Co., Ltd., Tokyo, Japan

[21] Appl. No.: 871,546

[22] Filed: Apr. 21, 1992

[30] Foreign Application Priority Data

Apr. 22, 1991 [JP] Japan .................. 3-116633

[51] Int. Cl.$^5$ .................. G03G 5/00; G03G 15/00
[52] U.S. Cl. .................. 430/78; 430/56
[58] Field of Search .................. 430/56, 78

[56] References Cited

U.S. PATENT DOCUMENTS

| 2,770,029 | 11/1956 | Ueltz . |
| 3,100,885 | 8/1963 | Welkowitz et al. . |
| 3,357,889 | 12/1967 | Byrne et al. . |
| 3,708,292 | 1/1973 | Brach et al. . |

FOREIGN PATENT DOCUMENTS

| 48-34189 | 5/1973 | Japan . |
| 49-105536 | 10/1974 | Japan . |
| 50-38543 | 4/1975 | Japan . |
| 57-148745 | 9/1982 | Japan . |
| 58-21414 | 2/1983 | Japan . |
| 61-151659 | 7/1986 | Japan . |

OTHER PUBLICATIONS

Diel et al., "Cofacial Assembly Of Partially Oxidized Metallomacrocycles As An Approach To Controlling Lattice Architecture In Low-Dimensional Molecular Solids. Chemical, Structural, Oxidation State, Transport, Magnetic, And Optical Properties Of Halogen-Doped [M(Phthalocyaninato)o]$_n$ Macromolecules, Where M=Si, Ge, and Sn"; J. Am. Chem. Soc., 1983, vol. 105, pp. 1551-1567.

Colaitis, "Etude de Quelques Derives de la Phtalocyanine Discussion Des Divers Modes D'Obtention,-Phtalocyanines D'Elements De Valence Superieur A Deux", Laboratoire De Chime Des Solides, Sorbonne, 1 Rue Victor Cousin, Paris, pp. 23-26.

Primary Examiner—John Kight, III
Assistant Examiner—T. Mosley
Attorney, Agent, or Firm—Oliff & Berridge

[57] ABSTRACT

Disclosed are novel crystals of hydroxyindium phthalocyanine, having distinct diffraction peaks at the particular angles of the Bragg angle ($2\theta\pm0.2$) in the X-ray diffraction pattern. An electrophotographic photoreceptor comprising an electroconductive support having thereon a light-sensitive layer containing at least one of an amorphous hydroxyindium phthalocyanine and the above hydroxyindium phthalocyanine crystals. The electrophotographic photoreceptor has excellent sensitivity and durability.

15 Claims, 11 Drawing Sheets

HYDROXYINDIUM PHTHALOCYANINE CRYSTALS AND ELECTROPHOTOGRAPHIC PHOTORECEPTOR

FIELD OF THE INVENTION

The present invention relates to novel crystals of hydroxyindium phthalocyanine useful as a photoconductive material and an electrophotographic photoreceptor.

BACKGROUND OF THE INVENTION

Phthalocyanines are useful as materials for painting compositions, printing inks and catalysts and as electronic materials and, in particular, they have recently been broadly investigated as materials for electrophotographic photoreceptors, materials for optical recording and materials for photo-electric conversion.

Regarding electrophotographic photoreceptors, recently, there is demand for extending the light-sensitive wavelength range of organic photoconductive materials, which have heretofore been proposed, up to the near infrared wavelength range of semiconductor lasers (780 to 830 nm) so as to use the materials as a photoreceptor for a digital recording system such as a laser printer. From this viewpoint, squalilium compounds (as described, e.g., in JP-A-49-105536 and JP-A-58-21414), (the term "JP-A" as used herein means an "unexamined published Japanese patent application"), triphenylamine trisazo compounds (as described, e.g., JP-A-61-151659) and phthalocyanine compounds (as described, e.g., JP-A-48-34189 and JP-A-57-148745) have been proposed as photoconductive materials for semiconductor lasers.

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently meet the conditions.

In order to overcome various drawbacks of the known photoconductive materials, the materials have been investigated with respect to the relationship between the crystal form and the electrophotographic characteristics. In particular, many reports relating to phthalocyanine compounds have heretofore been disclosed.

In general, it has been known that phthalocyanine compounds have various crystal forms, depending upon the difference in the manufacture method and treating method, and that the difference in the crystal form has a great influence on the photo-electric conversion characteristics of phthalocyanine compounds, for example, with respect to copper phthalocyanine, various crystal forms of $\alpha$, $\pi$, $\frac{1}{4}\rho$, $\gamma$ and $\delta$ are known in addition to a stable crystal form of $\beta$. It has been also known that these crystal forms are mutually transferable to each other by mechanical strain force, acid treatment, organic solvent treatment or heat treatment (as disclosed, e.g., in U.S. Pat. Nos. 2,770,029, 3,100,885, 3,708,292 and 3,357,989). JP-A-50-38543 describes the difference in crystal forms of copper phthalocyanine and electrophotographic characteristics of them.

However, the above-mentioned phthalocyanine compounds which have heretofore been proposed are not sufficient in point of the light sensitivity and the durability when used as a light-sensitive material, and development of novel phthalocyanine compounds which may be satisfactorily used as a light-sensitive material is desired.

SUMMARY OF THE INVENTION

The present invention has been made in view of the above-mentioned situation. Specifically, one object of the present invention is to provide novel hydroxyindium phthalocyanine crystals.

Another object of the present invention is to provide an electrophotographic photoreceptor having a light-sensitive layer containing the hydroxyindium phthalocyanine crystals.

As a result of investigation, the present inventors have found that novel amorphous hydroxyindium phthalocyanine or novel crystals of hydroxyindium phthalocyanine having high sensitivity and durability can be obtained by applying simple treatment to hydroxyindium phthalocyanine as obtained by synthesis. On the basis of the finding, the present invention has been completed.

Accordingly, the present invention provides first hydroxyindium phthalocyanine crystals having distinct diffraction peaks at 6.9°, 9.8°, 14.9°, 16.3°, 19.8°, 25.4°, 26.6° and 28.1° of the Bragg angle ($2\theta \pm 0.2$) in the X-ray diffraction pattern.

The present invention also provides second hydroxyindium phthalocyanine crystals having distinct diffraction peaks at 7.0°, 10.5°, 15.7°, 16.2°, 19.2°, 24.5°, 26.8° and 28.1° of the Bragg angle ($2\theta \pm 0.2$) in the X-ray diffraction pattern.

The present invention also provided third hydroxyindium phthalocyanine crystals having distinct diffraction peaks at 7.4°, 11.5° and 18.3°, 20.1°, 23.7°, 27.3°, 28.3° and 29.8° of the Bragg angle ($2\theta \pm 0.2$) in the X-ray diffraction pattern.

There are also provided fourth hydroxyindium phthalocyanine crystals having strong diffraction peaks at 7.0°, 10.3° and 16.4° of the Bragg angle ($2\theta \pm 0.2$) in the X-ray diffraction pattern.

The present invention also provides fifth hydroxyindium phthalocyanine crystals having distinct diffraction peaks at 7.3°, 8.8°, 11.8°, 16.5°, 17.6°, 18.4°, 18.9°19.7°, 20.5°, 23.1°, 25.3°, 25.7° and 30.1° of the Bragg angle ($2\theta \pm 0.2$) in the X-ray diffraction pattern.

The present invention also provides sixth hydroxyindium phthalocyanine crystals having distinct diffraction peaks at 8.1°, 8.4°, 9.3°, 10.0°, 15.6°, 17.5°, 22.5°, and 23.4° of the Bragg angle ($2\theta \pm 0.2$) in the X-ray diffraction pattern.

The present invention further provides an electrophotographic photoreceptor comprising an electroconductive support having thereon a light-sensitive layer containing at least one of an amorphous hydroxyindium phthalocyanine and the above-mentioned first to sixth hydroxyindium phthalocyanine crystals.

DETAILED EXPLANATION OF THE INVENTION

Hydroxyindium phthalocyanines of the present invention are presented by a general formula (I):

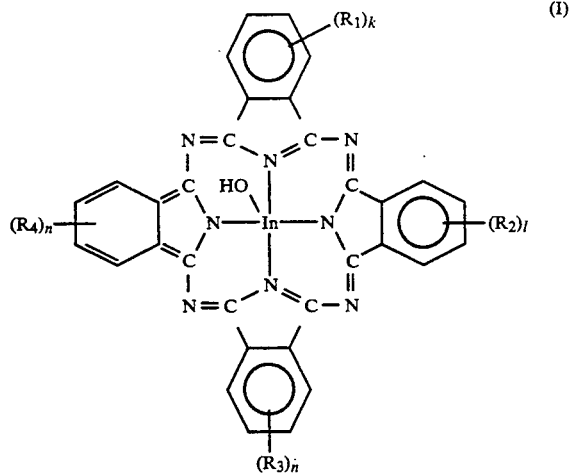

where R1, R2, R3 and R4 each represent a halogen atom or an aliphatic alkoxy group having from 1 to 5 carbon atoms; and k, l, m and n each represents an integer of from 0 to 4.

Hydroxyindium phthalocyanine can be prepared by conventional process. For example, a solution obtained by dissolving chloroindium phthalocyanine in conc. sulfuric acid is poured into water, and the resulting mixture is neutralized with ammonia to obtain hydroxyindium phthalocyanine (as disclosed in *Bull. Soc. Chim. France*, 1962, pp. 23–26 (1962)); or chloroindium phthalocyanine is hydrolyzed to obtain hydroxyindium phthalocyanine (as disclosed in *J. Am. Chem. Soc.*, Vol. 105, No. 6 (1983)).

Figure 1:
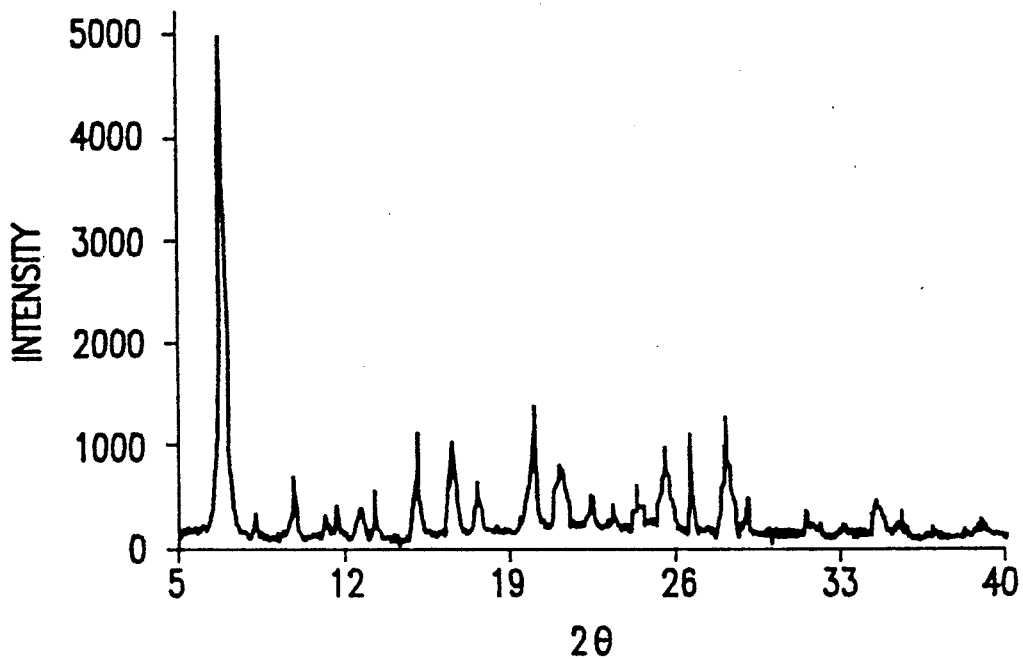
FIG. 1 shows a powdery X-ray diffraction pattern of hydroxyindium phthalocyanine crystals obtained in Synthesis Example.
Figure 2:
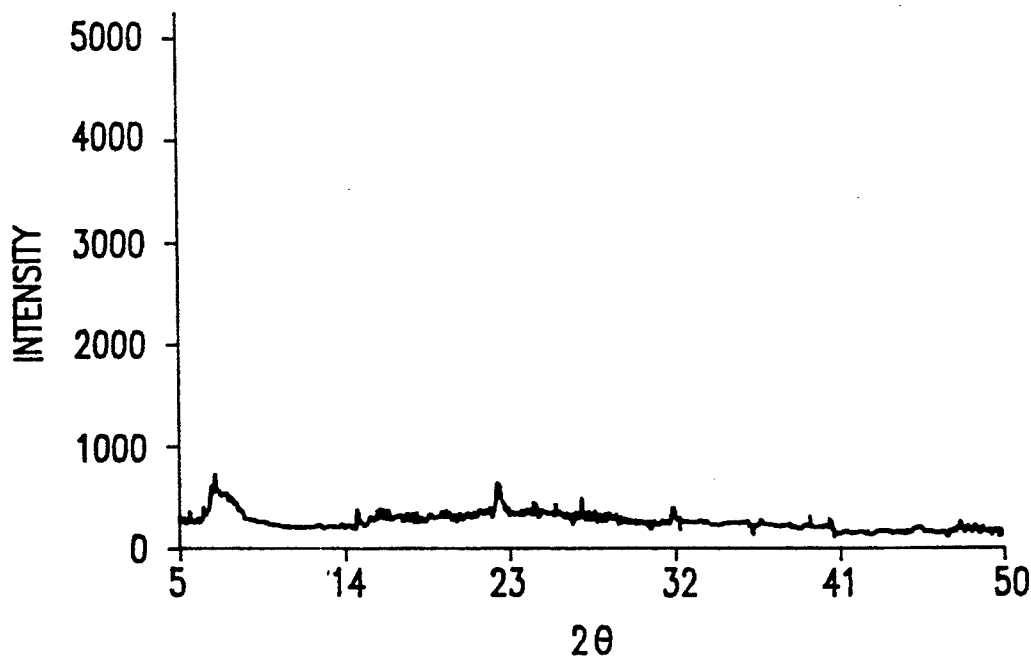
FIG. 2 is a powdery X-ray diffraction pattern of an amorphous hydroxyindium phthalocyanine obtained in Synthesis Example.
Figure 3:
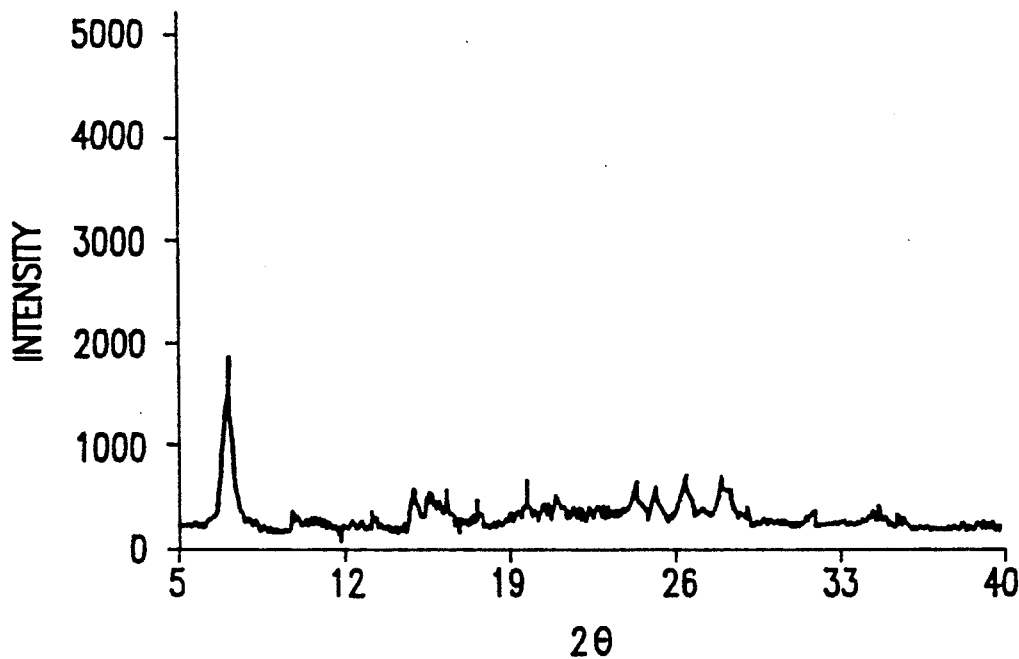
FIG. 3 is a powdery X-ray diffraction pattern of hydroxyindium phthalocyanine crystals obtained in Example 1.
Figure 4:
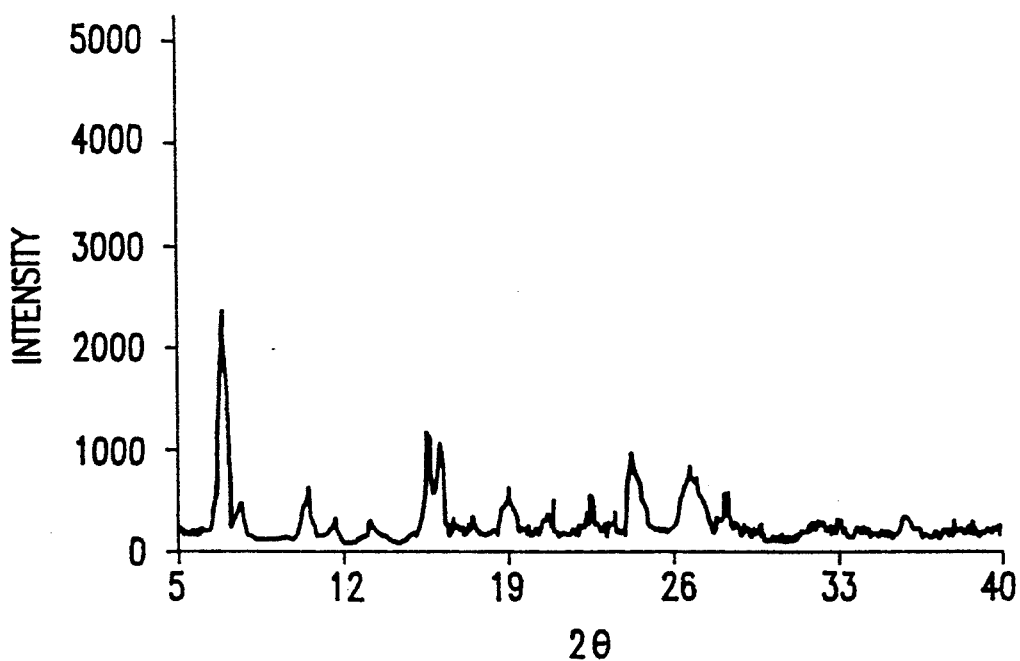
FIG. 4 is a powdery X-ray diffraction pattern of hydroxyindium phthalocyanine crystals obtained in Example 2.
Figure 5:
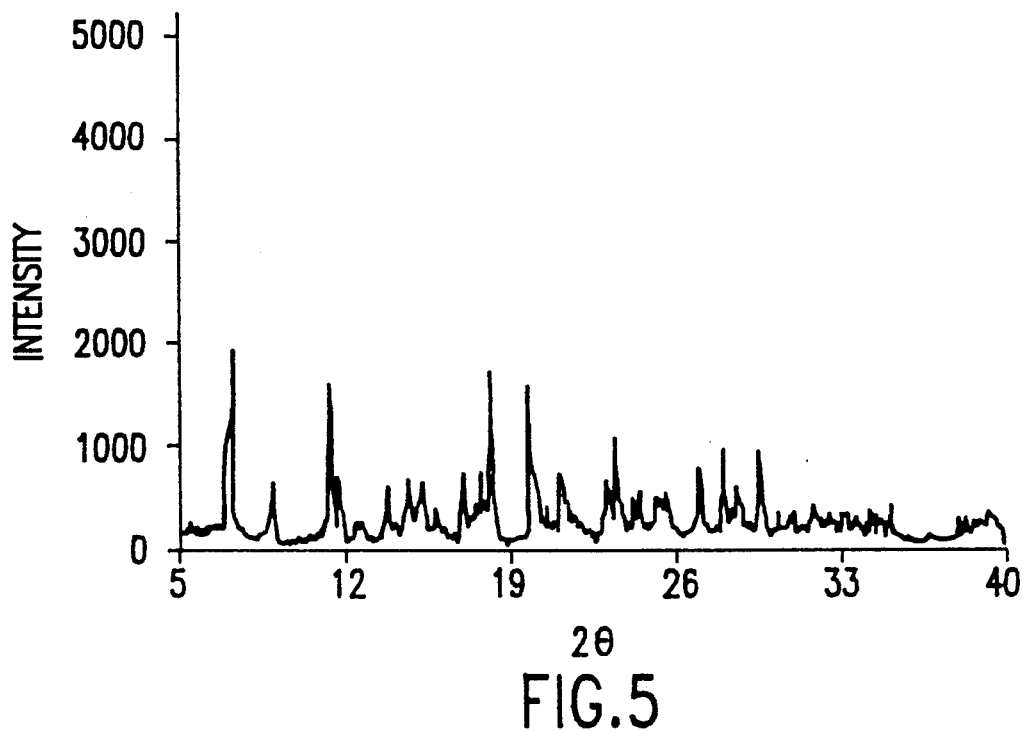
FIG. 5 is a powdery X-ray diffraction pattern of hydroxyindium phthalocyanine crystals obtained in Example 3.
Figure 6:
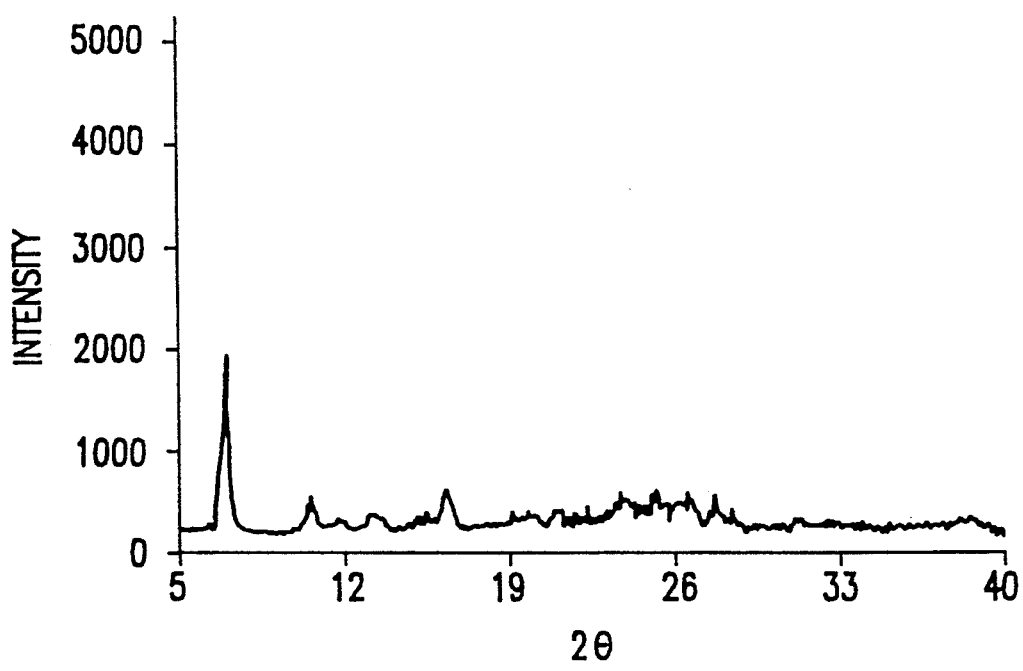
FIG. 6 is a powdery X-ray diffraction pattern of hydroxyindium phthalocyanine crystals obtained in Example 4.
Figure 7:
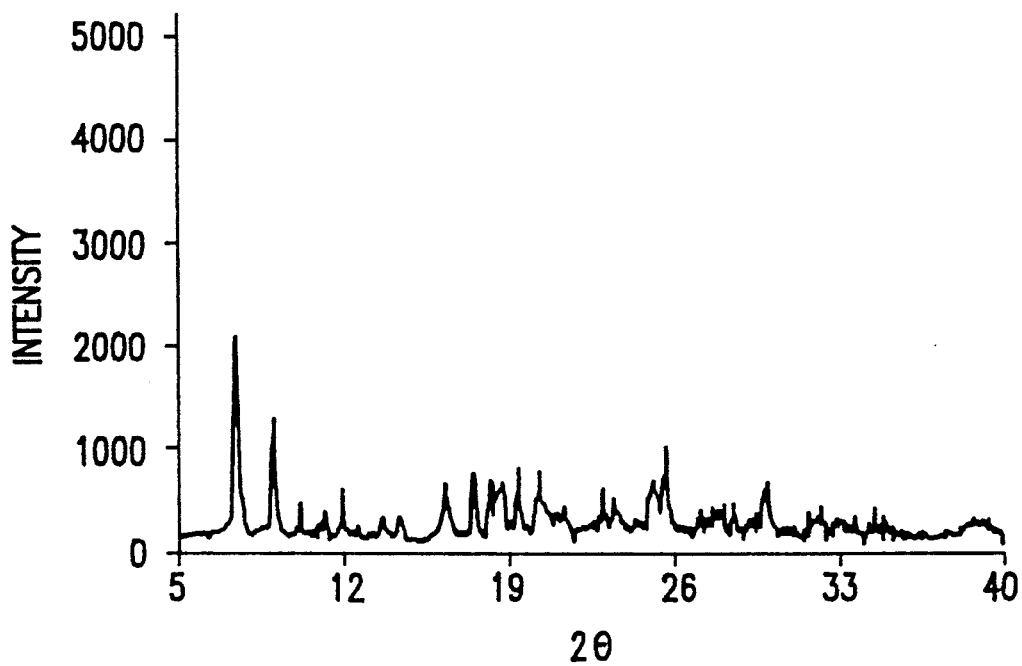
FIG. 7 is a powdery X-ray diffraction pattern of hydroxyindium phthalocyanine crystals obtained in Example 5.
Figure 8:
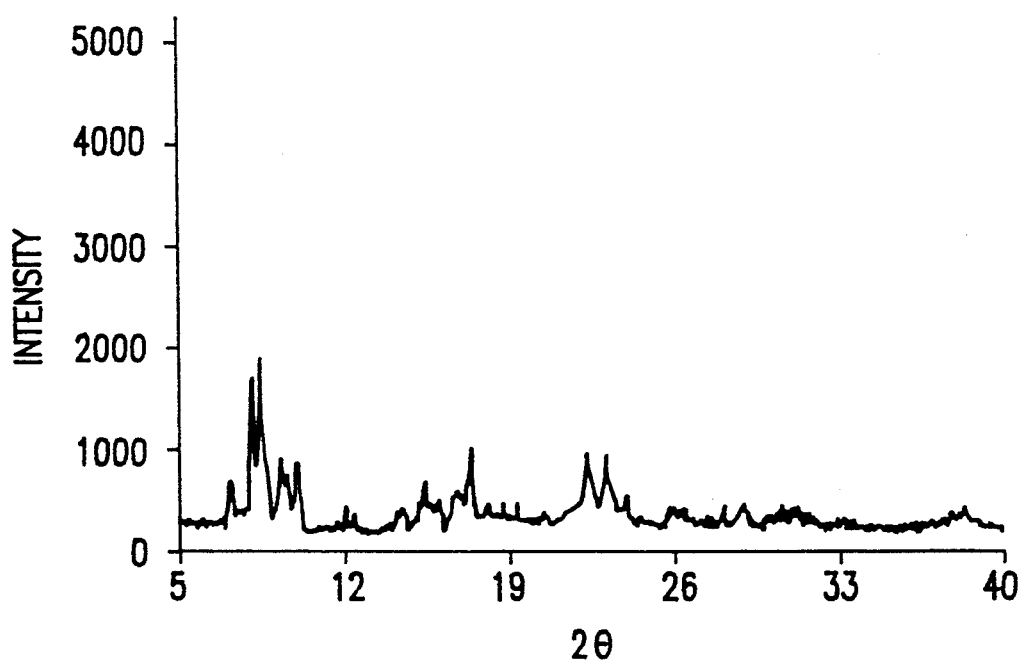
FIG. 8 is a powdery X-ray diffraction pattern of hydroxyindium phthalocyanine crystals obtained in Example 6.
Figure 9:
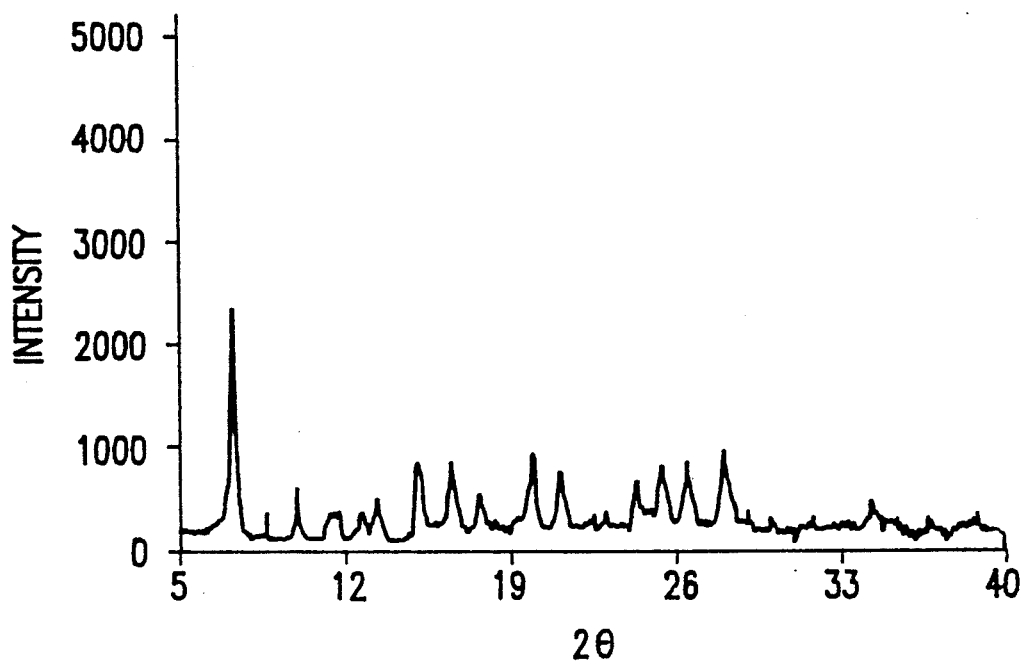
FIG. 9 is a powdery X-ray diffraction pattern of hydroxyindium phthalocyanine crystals obtained in Example 7.

In the present invention, the X-ray diffraction pattern is the measurement results of intensities of the Bragg angle ($2\theta$) with respect to CuK$_\alpha$ characteristic X-ray (wavelength: 1.541 Å). The measurement conditions are as follows:

Apparatus: X-ray diffractiometer (RAD-RC produced by Rigaku K.K.)
Target: Cu (1.54050 Å)
Voltage: 40.0 KV
Start angle: 5.00 deg
Stop angle: 40.00 deg
Step angle: 0.020 deg The aforementioned first to sixth hydroxyindium phthalocyanine crystals of the present invention have novel crystal forms. FIG. 1 to FIG. 9 are X-ray diffraction patterns of the hydroxyindium phthalocyanine crystals. FIG. 1, FIG. 3 and FIG. 9 relate to the first hydroxyindium phthalocyanine crystals. FIG. 4 relates to the second hydroxyindium phthalocyanine crystals. FIG. 5 relates to the third hydroxyindium phthalocyanine crystals. FIG. 6 relates to the fourth hydroxyindium phthalocyanine crystals. FIG. 7 relates to the fifth hydroxyindium phthalocyanine crystals. FIG. 8 relates to the sixth hydroxyindium phthalocyanine crystals.

These novel hydroxyindium phthalocyanine crystals can be produced in the manner as mentioned below for example.

Chloroindium phthalocyanine is subjected to hydrolysis in an acid or alkaline solution or to acid-pasting so as to produce hydroxyindium phthalocyanine; and (a) the resulting hydroxyindium phthalocyanine is directly treated with a solvent, or (b) it is amorphatized and powdered, and then treated with a solvent, or (c) it is wet-powdered in a ball mill or the like along with a solvent, to thereby attain crystal conversion.

The solvent to be used in the respective processes (a) to (c) mentioned above may be any ordinary one Examples thereof include aromatic solvents (e.g., toluene, chlorobenzene), halogenated hydrocarbons (e.g., dichloromethane, methylene chloride dichloroethane), amides (e.g., DMF, NMP, DMA), glycols (e.g., ethylene glycol, glycerin, polyethylene glycol), alcohols (e.g., methanol, ethanol), ketones (e.g., acetone, methyl ethyl ketone), sulfoxides (e.g., dimethylsulfoxide), organic amines (e.g., pyridine, piperidine), acetates (e.g., ethyl acetate, butyl acetate) and ethers (e.g., THF, dioxane), as well as a mixed solvent system comprising two or more of them, and an aqueous mixed solvent system comprising water and one or more of the organic solvents. The proportion of the solvent to phthalocyanine is generally from 1/1 to 200/1, preferably and from 10/1 to 100/1.

The above solvents can be appropriately selected to obtain hydroxyindium phthalocyanine crystals of the present invention. Hydroxyindium phthalocyanine crystals having distinct diffraction peaks at 6.9°, 9.8°, 14.9°, 16.3°, 19.8°, 25.4°, 26.6° and 28.1° of the Bragg angle ($2\theta \pm 0.2$) in the X-ray diffraction pattern can preferably be obtained by using aromatic solvents, such as chlorobenzene and toluene, or a mixed solvent of water and chlorobenzene and toluene, or a mixed solvent of water and aromatic solvents with the content of the aromatic solvent of 1% or more. Hydroxyindium phthalocyanine crystals 16.2°, 19.2°, 24.5° and 26.8° of the Bragg angle ($2\theta \pm 0.2$) in the X-ray diffraction pattern can preferably be obtained by halogen solvents such as methylene chloride and dichloroethylene. Hydroxyindium phthalocyanine crystals having distinct diffraction peaks at 7.4°, 11.5°, 18.3°, 20.1°, 23.7°, 28.3° and 29.8° of the Bragg angle ($2\theta \pm 0.2$) in the X-ray diffraction pattern can preferably be obtained by ketone solvents such as methyl ethyl ketone and acetone. Hydroxyindium phthalocyanine crystals having distinct diffraction peaks at 7.0°, 10.3° and 16.4° of the Bragg angle ($2\theta \pm 0.2$) in the X-ray diffraction pattern can preferably be obtained by using polyhydric alcohol solvents such as ethylene glycol and glycerin. Hydroxyindium phthalocyanine crystals having distinct diffraction peaks at 7.3°, 8.8°, 11.8°, 16.5°, 17.6°, 18.4°, 18.9°, 19.7°, 20.5°, 23.1°, 25.3°, 25.7° and 30.1° of the Bragg angle ($2\theta \pm 0.2$) in the X-ray diffraction pattern can preferably be obtained by using ether solvents such as tetrahydrofuran (THF) and dioxane. Hydroxyindium phthalocyanine crystals having distinct diffraction peaks at 8.1°, 8.4°, 9.3°, 10.0°, 15.6°, 17.5°, 22.5° and 23.4° of the Bragg angle ($2\theta \pm 0.2$) in the X-ray diffraction pattern can preferably be obtained by using amide solvents such as dimethylformamide (DMF) and dimethylacetamide (DMA).

The present invention also provides an electrophotographic photoreceptor, which contains an amorphous hydroxyindium phthalocyanine or the above-mentioned hydroxyindium phthalocyanine crystals as the photoconductive material in the light-sensitive layer.

The amorphous hydroxyindium phthalocyanine can be preferably obtained in such a manner that hydroxyindium phthalocyanine synthesized by hydrolyzing chloroindium phthalocyanine is milled in an automatic mortar mill for 30 minutes to 10 hours.

In the photographic photoreceptor of the present invention, the light-sensitive layer may be a single layer or may also have a laminated structure composed of a charge generating layer and a charge transporting layer. In the latter case, the charge generating layer comprises the above-mentioned hydroxyindium phthalocyanine crystals and a binder resin.

The binder resin used in the charge generating layer may be selected from insulating resins of a broad range or may also be selected from organic photoconductive polymers such as poly-N-vinyl carbazole, polyvinyl anthracene and polyvinyl pyrene. Preferred examples of the binder resin include insulating resins such as polyvinyl butyral, polyacrylates (e.g., polycondensate of bisphenol A and phthalic acid), polycarbonates, polyesters, phenoxy resins, vinyl chloride-vinyl acetate copolymer, polyvinyl acetate, acrylic resins, polyacrylamide, polyamides, polyvinyl pyridine, cellulose resins, urethane resins, epoxy resins, casein, polyvinyl alcohol and polyvinyl pyrrolidone.

The charge generating layer may be formed by dispersing the above-mentioned hydroxyindium phthalocyanine crystals in a solution containing the above-mentioned binder resin dissolved in an organic solvent to prepare a coating composition followed by coating the coating composition on an electroconductive support. The proportion of the hydroxyindium phthalocyanine crystals to the binder resin is generally from 40/1 to 1/10, preferably from 10/1 to 1/4, by weight. If the proportion of the hydroxyindium phthalocyanine crystals is too high, the stability of the coating liquid tends to be lower. If it is too low, the sensitivity tends to be lower. Therefore, the proportion is preferably within the above range.

The solvent to be used is desired to be selected from those which do not dissolve the adjacent subbing layer described above. Specific examples of the organic solvents include alcohols such as methanol, ethanol and isopropanol; ketones such as acetone, methyl ethyl ketone and cyclohexanone; amides such as N,N-dimethylformamide and N,N-dimethylacetamide; dimethylsulfoxides; ethers such as tetrahydrofuran, dioxane and ethylene glycol monomethyl ether; esters such as methyl acetate and ethyl acetate; halogenated aliphatic hydrocarbons such as chloroform, methylene chloride, dichloroethylene, carbon tetrachloride and trichloroethylene; and aromatic hydrocarbons such as benzene, toluene and dichlorobenzene.

Coating of the coating composition may be effected by any ordinary coating method, such as dip coating method, spray coating method, spinner coating method, bead coating method, wire bar coating method, blade coating method, roller coating method or curtain coating method. Drying of the coated layer is preferably effected by drying to touch at room temperature followed by hot drying under heat. The hot drying may be effected at a temperature of from 30° to 200° C. for a period of time of from 5 minutes to 2 hours under static condition or with blowing. The thickness of the charge generating layer may be, in general, approximately from 0.05 to 5 μm.

The charge transporting layer comprises a charge transporting material and a binder resin.

As the charge transporting material, any and every known compound can be used. Examples thereof include polycyclic aromatic compounds such as anthracene, pyrene and phenanthrene compounds; nitrogen-containing heterocyclic compounds such as indole, carbazole and imidazole compounds; as well as pyrazoline compounds, hydrazone compounds, triphenylmethane compounds, triphenylamine compounds, enamine compounds, and stilbene compounds.

In addition, photoconductive polymers such as poly-N-vinyl carbazole, halogenated poly-N-vinyl carbazoles, polyvinyl anthracene, poly-N-vinylphenyl anthracene, polyvinyl pyrene, polyvinyl acridine, polyvinyl acenaphthylene, polyglycidyl dicarbazole, pyrene-formaldehyde resins, and ethylcarbazole-formaldehyde resins can also be used. These photoconductive polymers may form the layer by themselves.

As the binder resin, the same insulating resins as those mentioned in the above charge generating layer may be used.

The charge transporting layer may be formed by preparing a coating composition by dispersing the above-mentioned charge transporting material in a solution of the binder resin dissolved in an organic solvent which does not dissolve the adjacent subbing layer and charge generating layer, followed by coating the composition in the same manner as mentioned above. The proportion of the charge transporting material to the binder resin is generally within the range of from 5/1 to 1/5 by weight. The thickness of the charge transporting layer is generally within the range of approximately from 5 to 50 μm.

Where the electrophotographic photoreceptor of the present invention has a light-sensitive layer of a single layer constitution, the light-sensitive layer may be a photoconductive layer having such constitution that the above-mentioned hydroxyindium phthalocyanine crystals are dispersed in a layer comprising a charge transporting material and a binder resin. The proportion of the charge transporting material to the binder resin is preferably within the range of approximately from 1/20 to 5/1 by weight; and the proportion of the hydroxyindium phthalocyanine crystals to the charge transporting material is preferably within the range of approximately from 1/10 to 10/1 by weight. As the charge transporting material and the binder resin, those as mentioned above may be used; and the photoconductive layer may be formed in the manner as mentioned above.

As the electroconductive support, any known in ordinary electrophotographic photoreceptors can be used.

In the present invention, the electroconductive support may be coated with a subbing layer. Such a subbing layer is effective for inhibiting injection of any unnecessary charges from the electroconductive support and has an activity of elevating the charging property of the light-sensitive layer. In addition, it also has another function of improving the adhesiveness between the light-sensitive layer and the electroconductive support. Examples of the material for constituting the subbing layer include polyvinyl alcohol, polyvinyl pyrrolidone, polyvinyl pyridine, cellulose ethers, cellulose esters, polyamides, polyurethane, casein, gelatin, polyglutamic acid, starch, starch acetate, aminostarches, polyacrylic acids, polyacrylamide, zirconium chelate compounds, zirconium alkoxide compounds, organic zirconium alkoxide compounds, organic titanyl compounds, and silane coupling agents. The thickness of the subbing layer is preferably within the range of approximately from 0.05 to 2 μm.

The present invention will be explained in more detail by way of the following examples, which, however, are not intended to restrict the scope of the present invention. Unless otherwise specifically defined, all "parts" therein are by weight.

SYNTHESIS EXAMPLE

Synthesis of hydroxyindium phthalocyanine crystals and amorphous hydroxyindium phthalocyanine:

30 parts of 1,3-diiminoisoindoline and 11.4 parts of indium trichloride were put in 230 parts of quinoline and reacted for 3 hours at 200° C.. The product formed was taken out by filtration, washed with acetone and methanol and dried to obtain 29 parts of chloroindium phthalocyanine crystals.

3 parts of the thus obtained chloroindium phthalocyanine crystals were added to a solution composed of 1.5 parts of sodium hydroxide, 18 parts of pyridine and 70 parts of distilled water and heated under reflux for 30 hours. The crystals formed were taken out by filtration, washed with distilled water and dried to obtain 1.8 parts of hydroxyindium phthalocyanine crystals. FIG. 1 shows the powder X-ray diffraction pattern of the crystals.

The crystals were milled in an automatic mortar mill for 6 hours to obtain amorphous hydroxyindium phthalocyanine. FIG. 2 shows the powder X-ray diffraction pattern of the amorphous hydroxyindium phthalocyanine.

EXAMPLE 1

2.0 parts of the amorphous hydroxyindium phthalocyanine crystals obtained in Synthesis Example were stirred in a ball mill along with a mixed solvent composed of 60 parts of water and 6 parts of monochlorobenzene and 120 parts of glass beads (diameter: 1 mm) for 24 hours, and the crystals obtained were washed with methanol and dried to obtain 1.5 parts of hydroxyindium phthalocyanine crystals.

FIG. 3 shows the powder X-ray diffraction pattern of the final crystals.

EXAMPLE 2

2.0 parts of the amorphous hydroxyindium phthalocyanine crystals obtained in Synthesis Example were stirred in a ball mill along with 60 parts of dichloromethane and 120 parts of glass beads (diameter: 1 mm) for 24 hours, and the crystals obtained were washed with dichloromethane and dried to obtain 1.5 parts of hydroxyindium phthalocyanine crystals.

Figure 11:
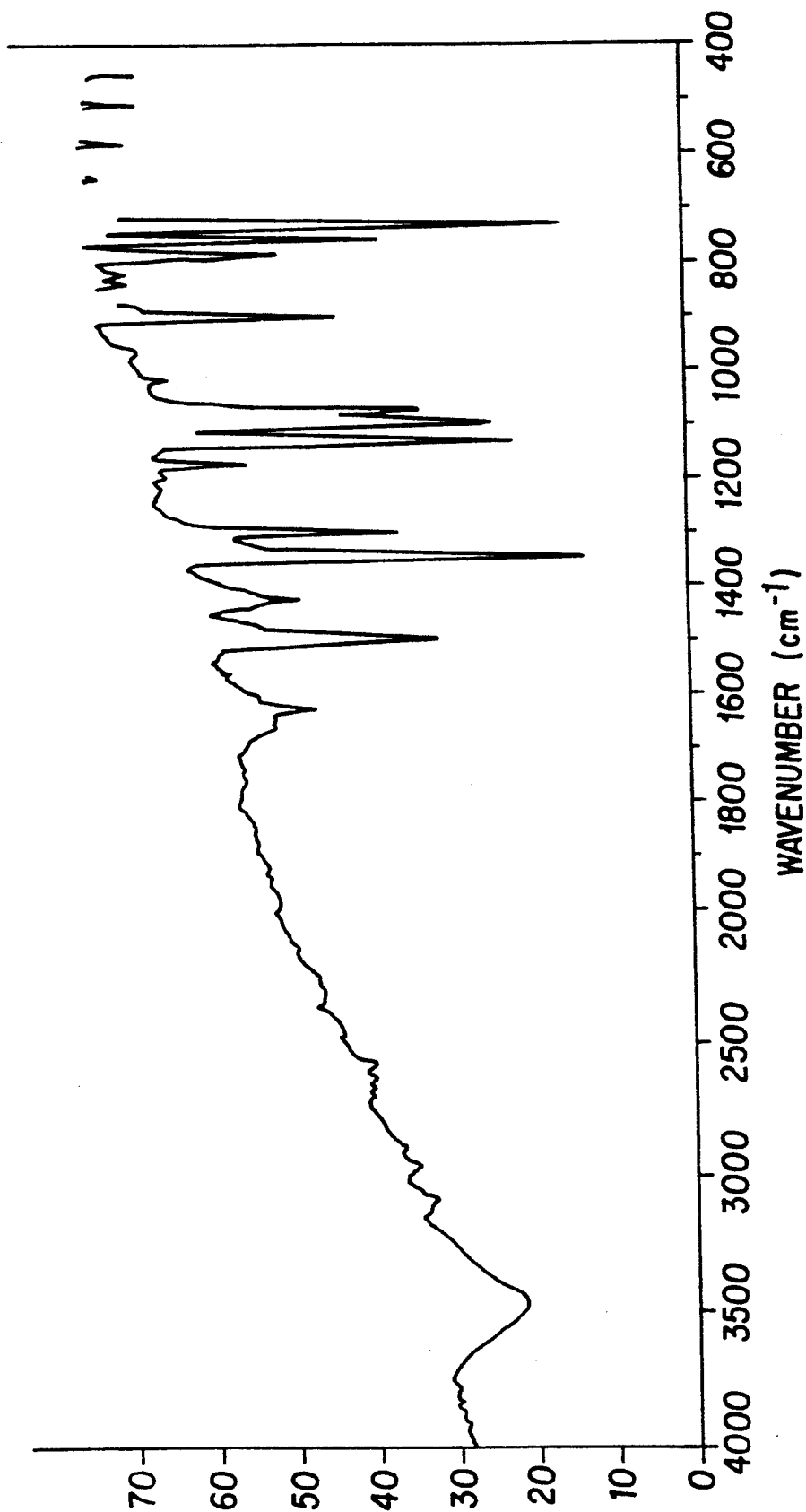
FIG. 11 is an infrared absorption spectrum of hydroxyindium phthalocyanine crystals obtained in Example 2.
Figure 12:
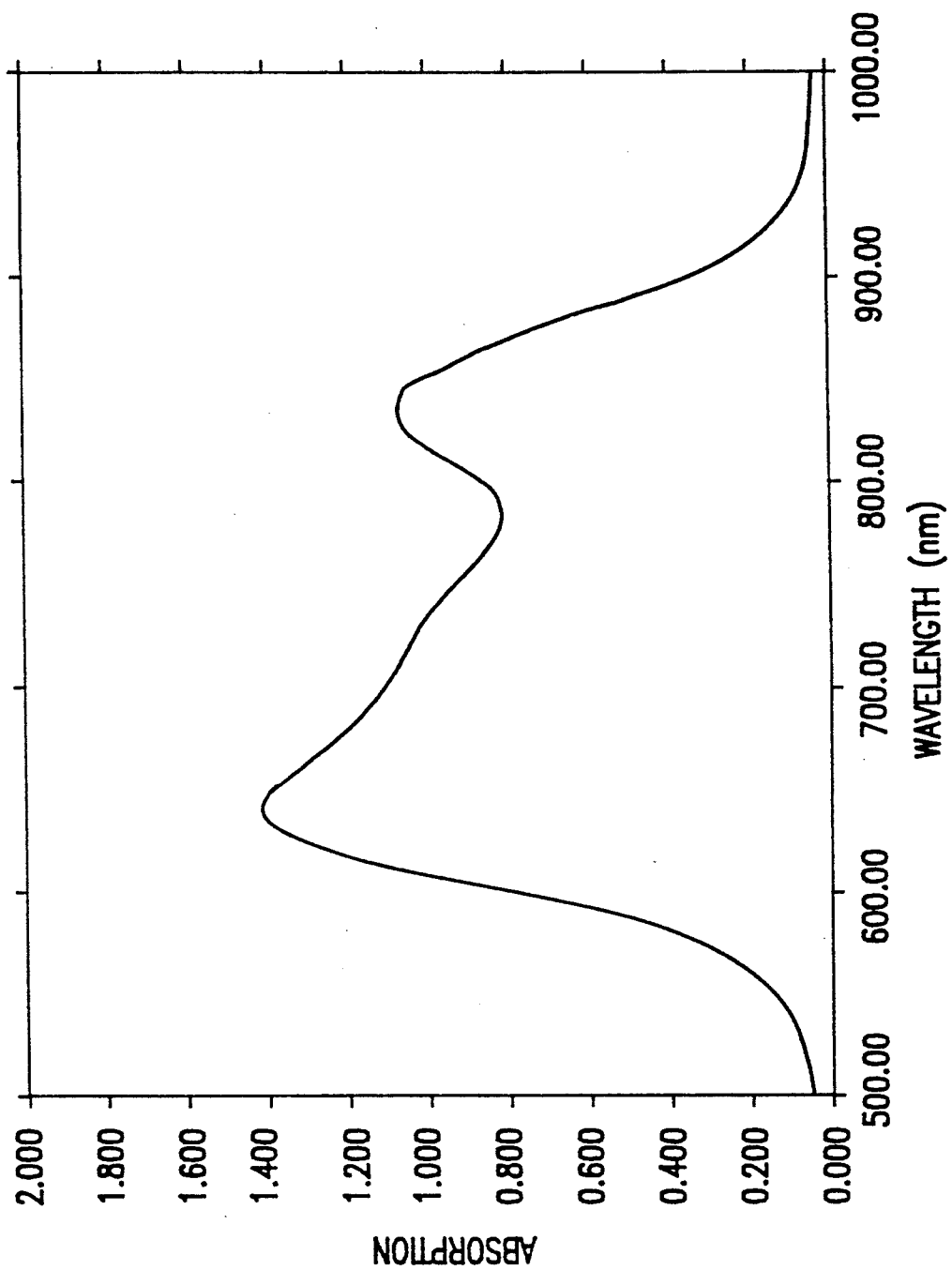
FIG. 12 is a visible-near infrared absorption spectrum of hydroxyindium phthalocyanine crystals obtained in Example 2.

FIG. 4 shows the powder X-ray diffraction pattern of the final crystals. FIG. 11 shows the infrared absorption spectrum of the final crystals. FIG. 12 shows the visible-near infrared absorption spectrum of the final crystals.

EXAMPLE 3

2.0 parts of the amorphous hydroxyindium phthalocyanine crystals obtained in Synthesis Example were stirred in a ball mill along with 60 parts of methyl ethyl ketone and 120 parts of glass beads (diameter: 1 mm) for 24 hours, and the crystals obtained were washed with methyl ethyl ketone and dried to obtain 1.5 parts of hydroxyindium phthalocyanine crystals.

FIG. 5 shows the powder X-ray diffraction pattern of the final crystals.

EXAMPLE 4

2.0 parts of the amorphous hydroxyindium phthalocyanine crystals obtained in Synthesis Example were stirred in a ball mill along with 60 parts of ethylene glycol and 120 parts of glass beads (diameter: 1 mm) for 4 hours, and the crystals obtained were washed with methanol and dried to obtain 1.5 parts of hydroxyindium phthalocyanine crystals.

Figure 13:
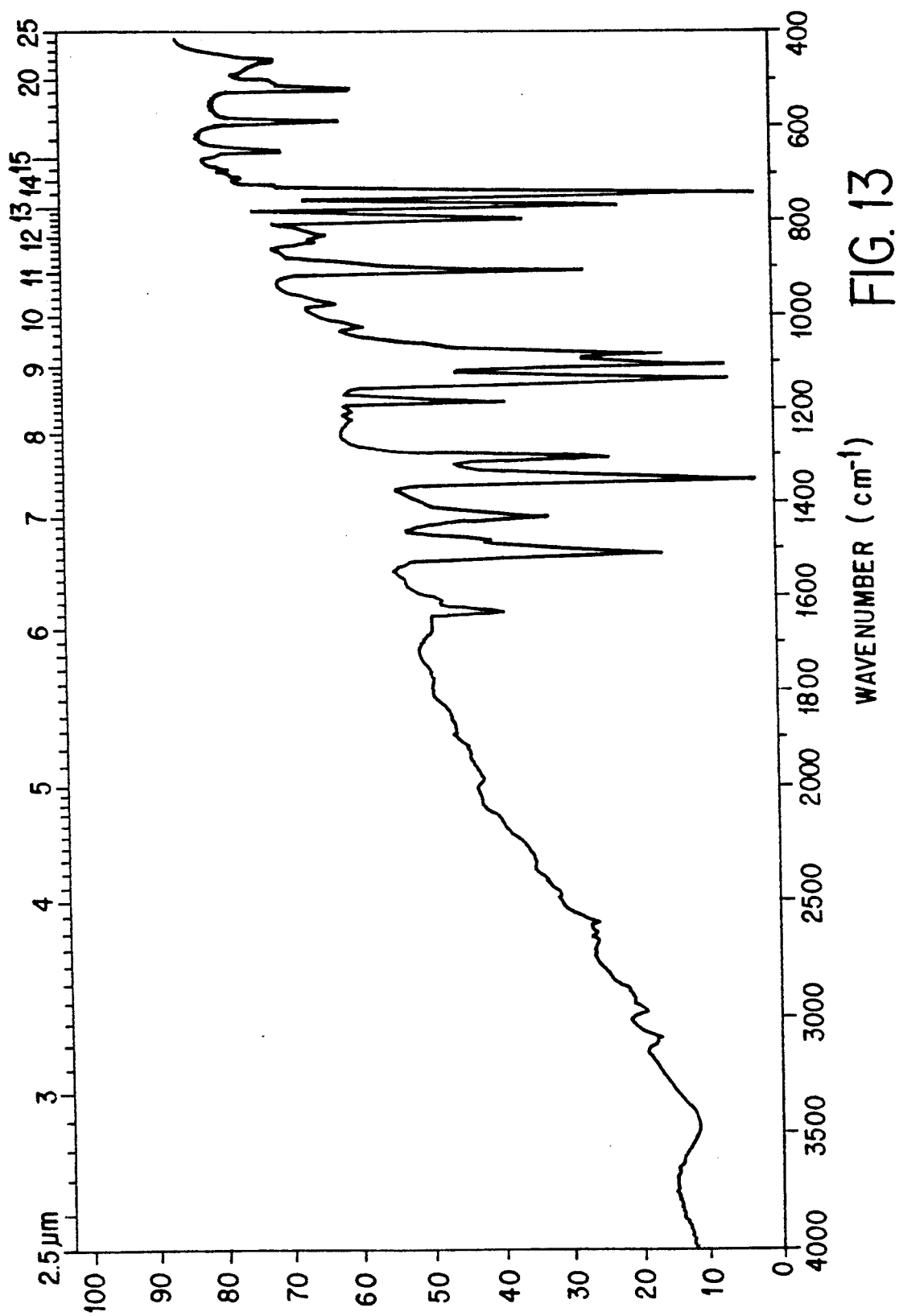
FIG. 13 is an infrared absorption spectrum of hydroxyindium phthalocyanine crystals obtained in Example 4.
Figure 14:
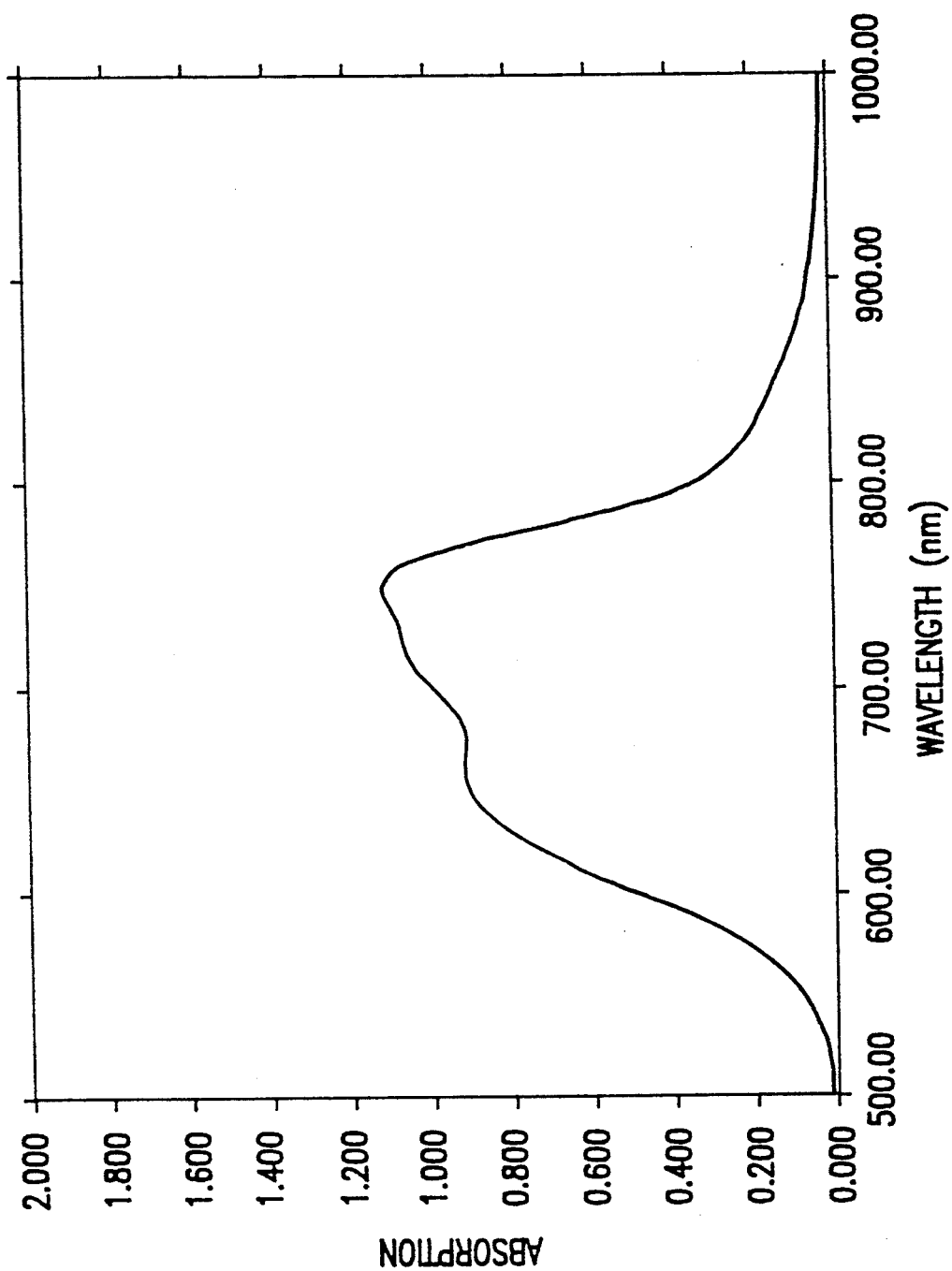
FIG. 14 is a visible-near infrared absorption spectrum of hydroxyindium phthalocyanine crystals obtained in Example 4.

FIG. 6 shows the powder X-ray diffraction pattern of the final crystals. FIG. 13 shows the infrared absorption spectrum of the final crystals. FIG. 14 shows the visible near infrared absorption spectrum of the final crystals.

EXAMPLE 5

2.0 parts of the amorphous hydroxyindium phthalocyanine crystals obtained in Synthesis Example were stirred in a ball mill along with 60 parts of tetrahydrofuran and 120 parts of glass beads (diameter: 1 mm) for 24 hours, and the crystals obtained were washed with methanol and dried to obtain 1.5 parts of hydroxyindium phthalocyanine crystals.

FIG. 7 shows the powder X-ray diffraction pattern of the final crystals.

EXAMPLE 6

2.0 parts of the amorphous hydroxyindium phthalocyanine crystals obtained in Synthesis Example were stirred in a ball mill along with 60 parts of dimethylformamide and 120 parts of glass beads (diameter: 1 mm) for 24 hours, and the crystals obtained were washed with methanol and dried to obtain 1.5 parts of hydroxyindium phthalocyanine crystals.

FIG. 8 shows the powder X-ray diffraction pattern of the final crystals.

EXAMPLE 7

2.0 parts of the amorphous hydroxyindium phthalocyanine crystals obtained in Synthesis Example were stirred in a ball mill along with 60 parts of chlorobenzene and 120 parts of glass beads (diameter: 1 mm) for 24 hours, and the crystals obtained were washed with methanol and dried to obtain 1.5 parts of hydroxyindium phthalocyanine crystals.

Figure 15:
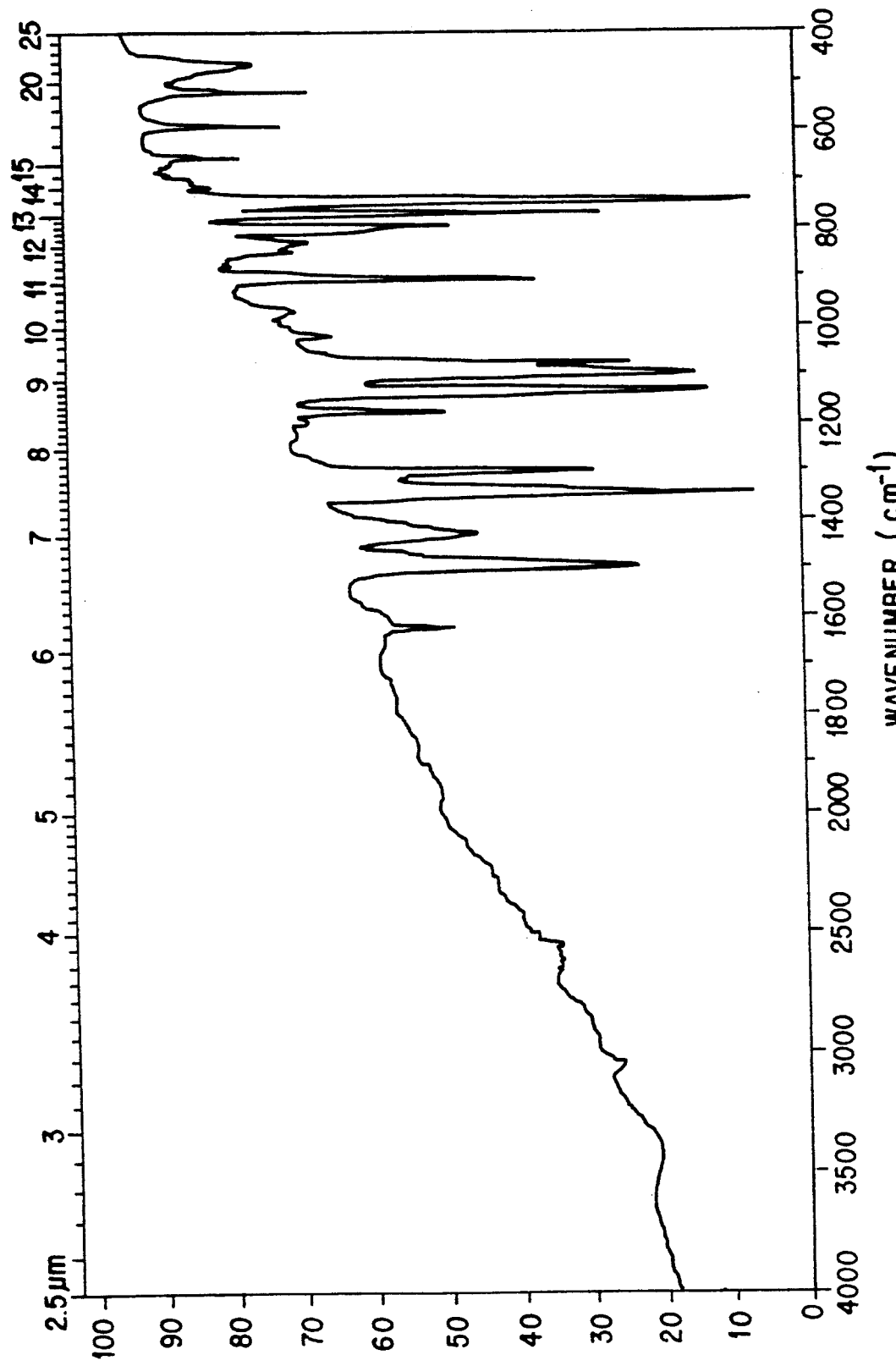
FIG. 15 is an infrared absorption spectrum of hydroxyindium phthalocyanine crystals obtained in Example 7.
Figure 16:
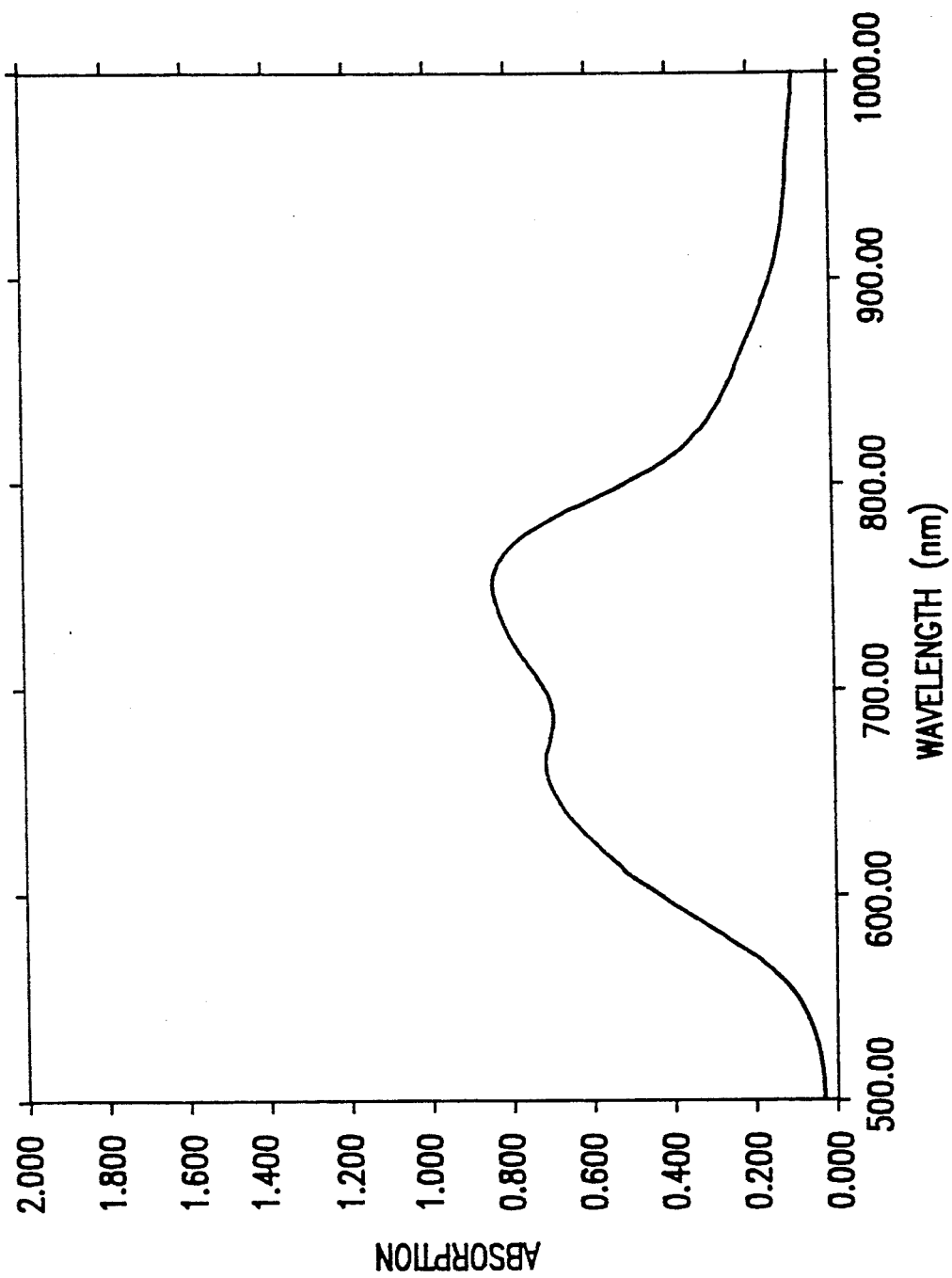
FIG. 16 is a visible-near infrared absorption spectrum of hydroxyindium phthalocyanine crystals obtained in Example 7.

FIG. 9 shows the powder X-ray diffraction pattern of the final crystals. FIG. 15 shows the infrared absorption spectrum of the final crystals. FIG. 16 shows the visible near infrared absorption spectrum of the final crystals.

EXAMPLES 8 TO 15

0.1 part of any one of the hydroxyindium phthalocyanine crystals obtained in Examples 1 to 7 and the amorphous hydroxyindium phthalocyanine obtained in Synthesis Example, the powder X-ray diffraction pattern is shown in FIG. 2, was blended with one part of polyvinyl butyral (S-Lec BM-S, trade name by Sekisui Chemical Co.) and 10 parts of cyclohexanone and the resulting mixture was dispersed by treating it in a paint shaker along with glass beads for one hour. The thus obtained coating composition was coated on an aluminum substrate by a dip-coating method and dried under heat at 100° C. for 5 minutes to form a charge generating layer having a thickness of 0.2 μm.

Next, one part of a compound having the following structural formula:

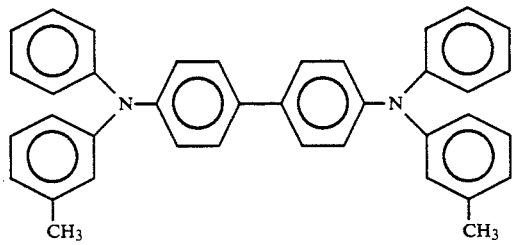

and one part of poly(4,4-cyclohexylidene-diphenylene carbonate) having the following structural formula:

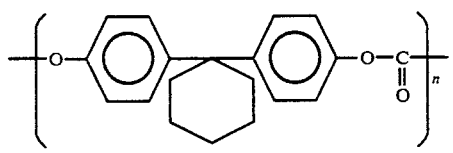

were dissolved in 8 parts of monochlorobenzene, and the resulting coating composition was coated over the charge generating layer as formed on the aluminum substrate, by a dip-coating method, and dried at 120° C. for one hour to form a charge transporting layer having a thickness of 20 μm.

The electrophotographic photoreceptor thus prepared was examined with respect to the following electrophotographic characteristics, under a normal temperature and normal humidity condition (20° C., 40% RH), a low temperature and low humidity condition (10° C., 15% RH) and a high temperature and high humidity condition (28° C., 80% RH), using an electrostatic duplicating paper test device (EPA-8100 Model, manufactured by Kawaguchi Denki Co.).

$V_{DDP}$: Surface potential in one second after $-6.0$ KV corona discharge for negative charging.

$E_{\frac{1}{2}}$: A 800 nm spectral light derived from a band pass filter was irradiated, and the exposure amount of the light necessary for lowering the surface potential to $\frac{1}{2}$ of the initial potential was measured to be $E_{\frac{1}{2}}$.

$V_{RP}$: Surface potential after irradiation of a white light of 50 erg/cm² for 0.5 second.

$\Delta E^{*}{}_{\frac{1}{2}}$: Amount of environment-dependent fluctuation of $E_{\frac{1}{2}}$ as measured under various ambient conditions.

$\Delta V_{DDP}$: Amount of fluctuation between $V_{DDP}$ after 1,000 times repetition of the above-mentioned charging and exposure.

$\Delta E_{\frac{1}{2}}$: The amount of fluctuation of $E_{\frac{1}{2}}$ after 1,000 times repetition of the above-mentioned charging and exposure.

$\Delta V_{RP}$: Amount of fluctuation between $V_{RP}$ after 1,000 times repetition of the above-mentioned charging and exposure and the initial $V_{RP}$.

The results obtained are shown in Table 1 below.

COMPARATIVE EXAMPLE

Figure 10:
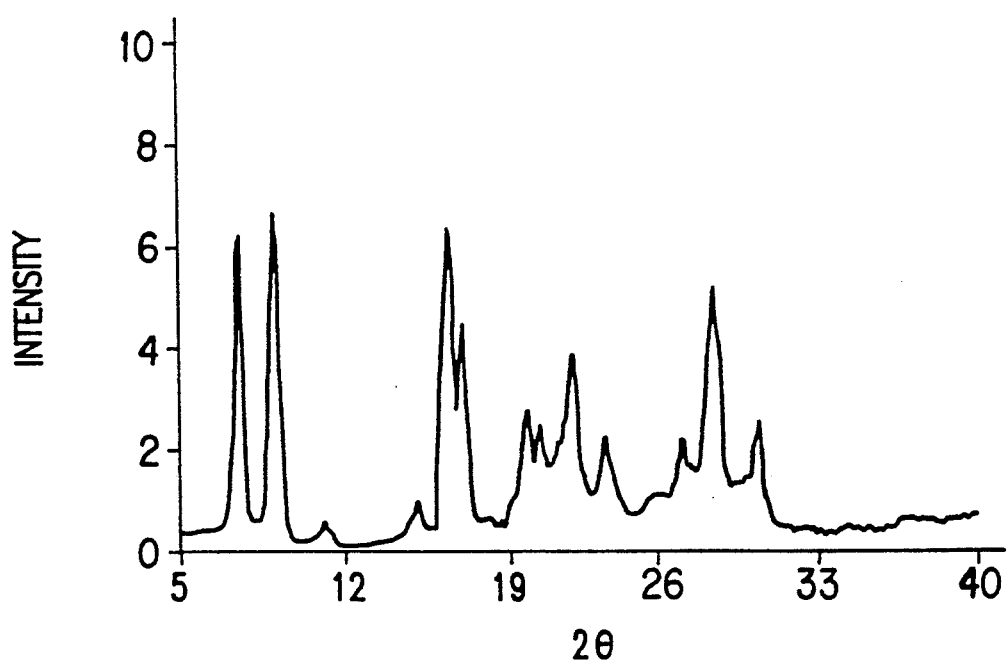
FIG. 10 is an X-ray diffraction pattern of X-type metal-free phthalocyanine crystals used in Comparative Example 1.

A comparative electrophotographic photoreceptor sample was prepared in the same manner as in Examples 8 to 15, except that 0.1 parts of an X-type metal-free phthalocyanine having an X-ray diffraction spectrum as shown in FIG. 10. This was examined to determine the electrophotographic characteristics also in the same manner as above, and the results obtained are shown in Table 1.

TABLE 1

| Example | $V_{DDP}$ (V) | Initial Characteristics $E_{1/2}$ (erg/cm²) | $V_{RP}$ (V) | Environment Stability $\Delta E^{*}{}_{1/2}$ (erg/cm²) | Stability, Durability $\Delta V_{DDP}$ (V) | $\Delta E_{1/2}$ (erg/cm²) | $\Delta V_{RP}$ (V) |
|---|---|---|---|---|---|---|---|
| Example 8 | −790 | 2.7 | 10 | 0.1 | 20 | 0.2 | 3 |
| Example 9 | −790 | 2.6 | 10 | 0.1 | 20 | 0.3 | 2 |
| Example 10 | −810 | 2.6 | 10 | 0.1 | 10 | 0.2 | 4 |
| Example 11 | −800 | 2.9 | 15 | 0.1 | 35 | 0.2 | 3 |
| Example 12 | −810 | 2.7 | 10 | 0.1 | 10 | 0.3 | 4 |
| Example 13 | −800 | 2.9 | 15 | 0.1 | 40 | 0.3 | 3 |
| Example 14 | −790 | 2.9 | 15 | 0.1 | 40 | 0.2 | 3 |
| Example 15 | −800 | 2.6 | 10 | 0.1 | 20 | 0.2 | 4 |
| Comparative Example | −790 | 2.9 | 20 | 0.3 | 30 | 0.6 | 12 |

As has been explained in detail in the above, the hydroxyindium phthalocyanine crystals of the present invention have novel crystal forms and the wavelength range of the light to which they are sensitive is extended to a long wavelength range. Therefore, they are extremely useful as photoconductive materials for electrophotographic photoreceptors such as printers using semiconductor lasers. The electrophotographic photoreceptors of the present invention having the above-mentioned hydroxyindium phthalocyanine crystals with a novel crystal form or having amorphous hydroxyindium phthalocyanine have excellent sensitivity and durability.

While the invention has been described in detail and with reference to specific embodiments thereof, it will be apparent to one skilled in the art that various changes and modifications can be made therein without departing from the spirit and scope thereof.

What is claimed is:

1. Hydroxyindium phthalocyanine crystals having distinct diffraction peaks at 6.9°, 9.8°, 14.9°, 16.3°, 19.8°, 25.4°, 26.6° and 28.1° of the Bragg angle (2θ±0.2) in the X-ray diffraction pattern.

2. Hydroxyindium phthalocyanine crystals having distinct diffraction peaks at 7.0°, 10.5°, 15.7°, 16.2°, 19.2°, 24.5° and 26.8° of the Bragg angle (2θ±0.2) in the X-ray diffraction pattern.

3. Hydroxyindium phthalocyanine crystals having distinct diffraction peaks at 7.4°, 11.5°, 18.3°, 20.1°, 23.7°, 27.3°, 28.3° and 29.8° of the Bragg angle (2θ±0.2) in the X-ray diffraction pattern.

4. Hydroxyindium phthalocyanine crystals having distinct diffraction peaks at 7.0°, 10.3° and 16.4° of the Bragg angle (2θ±0.2) in the X-ray diffraction pattern.

5. Hydroxyindium phthalocyanine crystals having distinct diffraction peaks at 7.3°, 8.8°, 11.8°, 16.5°, 17.6°, 18.4°, 18.9°, 19.7°, 20.5°, 23.1°, 25.3°, 25.7° and 30.1° of the Bragg angle (2θ±0.2) in the X-ray diffraction pattern.

6. Hydroxyindium phthalocyanine crystals having distinct diffraction peaks at 8.1°, 8.4°, 9.3°, 10.0°, 15.6°, 17.5°, 22.5° and 23.4° of the Bragg angle (2θ±0.2) in the X-ray diffraction pattern.

7. An electrophotographic photoreceptor comprising an electroconductive support having thereon a light-sensitive layer containing at least one of (a) an amorphous hydroxyindium phthalocyanine; (b) hydroxyindium phthalocyanine crystals having distinct diffraction peaks at 6.9°, 9.8°, 14.9°, 16.3°, 19.8°, 25.4°, 26.6° and 28.1° of the Bragg angle (2θ±0.2) in the X-ray diffraction pattern; (c) hydroxyindium phthalocyanine crystals having distinct diffraction peaks at 7.0°, 10.5°, 15.7°, 16.2°, 19.2°, 24.5° and 26.8° of the Bragg angle (2θ±0.2) in the X-ray diffraction pattern: (d) hydroxyindium phthalocyanine crystals having distinct diffraction peaks at 7.4°, 11.5°, 18.3°, 20.1°, 23.7°, 27.3°, 28.3° and 29.8° of the Bragg angle (2θ±0.2) in the X-ray diffraction pattern; (e) hydroxyindium phthalocyanine crystals having distinct diffraction peaks at 7.0°, 10.3° and 16.4° of the Bragg angle (2θ±0.2) in the X-ray diffraction pattern; (f) hydroxyindium phthalocyanine crystals having distinct diffraction peaks at 7.3°, 8.8°, 11.8°, 16.5°, 17.6°, 18.°, 18.9°, 19.7°, 20.5°, 23.1°, 25.3°, 25.7° and 30.1° of the Bragg angle (2θ±0.2) in the X-ray diffraction pattern; and (g) hydroxyindium phthalocyanine crystals having distinct diffraction peaks at 8.1°, 8.4°, 9.3°, 10.0°, 15.6°, 17.5°, 22.5° and 23.4° of the Bragg angle (2θ±0.2) in the X-ray diffraction pattern.

8. Hydroxyindium phthalocyanine crystals having distinct diffraction peaks at degrees of the bragg angle (2θ±0.2) in the X-ray diffraction pattern, prepared by treating hydroxyindium phthalocyanine with a solvent selected from the group consisting of aromatic solvent, mixed solvent of water and aromatic solvent, halogen solvent, ketone solvent, polyhydric alcohol solvent, ether solvent and amide solvent.

9. Hydroxyindium phthalocyanine crystals according to claim 8 having distinct diffraction peaks at 6.9°, 9.8°, 14.9°, 16.3°, 19.8°, 25.4°, 26.6° and 28.1° of the Bragg angle (2θ±0.2) in the X-ray diffraction pattern.

10. Hydroxyindium phthalocyanine crystals according to claim 8 having distinct diffraction peaks at 7.0°, 10.5°, 15.7°, 16.2°, 19.2°, 24.5° and 26.8° of the Bragg angle (2θ±0.2) in the X-ray diffraction pattern.

11. Hydroxyindium phthalocyanine crystals according to claim 8 having distinct diffraction peaks at 7.4°, 11.5°, 18.3°, 20.1°, 23.7°, 27.3°, 28.3° and 29.8° of the Bragg angle (2θ±0.2) in the X-ray diffraction pattern.

12. Hydroxyindium phthalocyanine crystals according to claim 8 having distinct diffraction peaks at 7.0°, 10.3° and 16.4° of the Bragg angle (2θ±0.2) in the X-ray diffraction pattern.

13. Hydroxyindium phthalocyanine crystals according to claim 8 having distinct diffraction peaks at 7.3°, 8.8°, 11.8°, 16.5°, 17.6°, 18.4°, 18.9°, 19.7°, 20.5°, 23.1°, 25.3°, 25.7° and 30.1° of the Bragg angle (2θ±0.2) in the X-ray diffraction pattern.

14. Hydroxyindium phthalocyanine crystals according to claim 8 having distinct diffraction peaks at 8.1°, 8.4°, 9.3°, 10.0°, 15.6°, 17.5°, 22.5° and 23.4° of the Bragg angle (2θ±0.2) in the X-ray diffraction pattern.

15. An electrophotographic photoreceptor comprising an electroconductive support having thereon a light sensitive layer containing at least one of (a) an amorphous hydroxyindium phthalocyanine and (b) a hydroxyindium phthalocyanine crystal according to claim 8.

* * * * *